United States Patent
Fischl et al.

[19]

[11] Patent Number: 5,917,306
[45] Date of Patent: Jun. 29, 1999

[54] MNEMONIC SYSTEM FOR INDICATING BATTERY CHARGE

[75] Inventors: Steven R. Fischl, Lawrenceville; Amy T. Deslyper, Dacula, both of Ga.

[73] Assignee: Motorola, Inc., Schaumburg, Ill.

[21] Appl. No.: 09/067,475

[22] Filed: Apr. 27, 1998

[51] Int. Cl.[6] .................................................. H02J 7/00
[52] U.S. Cl. ............................................................ 320/107
[58] Field of Search ................................... 320/107, 110, 320/112; D13/103, 107; 429/96, 97, 98, 100

[56] References Cited

U.S. PATENT DOCUMENTS 5,607,791   3/1997   Garcia ........................................ 429/96

Primary Examiner—Peter S. Wong
Assistant Examiner—Lawrence Luk
Attorney, Agent, or Firm—Felipe J. Farley

[57] ABSTRACT

Described is a system for indicating the state of charge of a battery comprising a safety cover with an opening and a battery which can be placed in the safety cover in two orientations. One marking on the battery indicates the battery has been charged and the other marking indicates the battery has been discharged. Only one of the markings shows through the opening when the safety cover is placed on the battery in one orientation, and only the other marking shows through the marking when the safety cover is placed on the battery in the other orientation. The mnemonic system is easy to manufacture and easy to use.

3 Claims, 1 Drawing Sheet

MNEMONIC SYSTEM FOR INDICATING BATTERY CHARGE

TECHNICAL FIELD

This invention relates in general to rechargeable batteries, and more specifically, to systems for indicating the charge state of a battery.

BACKGROUND OF THE INVENTION

Nearly forty million Americans now use a cellular telephone, and another seven million or so are expected to subscribe this year. Cellular telephone boutiques and kiosks are a fixture in nearly every mainstreet and mall in the United States. Cellular telephone sales have increased faster than those of facsimile machines, subscriptions to cable television, and video cassette recorders.

As the use of cellular telephones has increased, customers have come to expect ever greater convenience. The most critical feature in a cellular telephone is the battery. Cellular telephone users surveys have indicated that what users care about above all else is talk time. In order to increase their ability to chat on the telephone, users often carry spare batteries with them. However, there is often no immediate way to determine, or remember, whether or not a spare battery is charged or discharged. Therefore, there is a need for a system for determining immediately whether a battery is charged or discharged.

DETAILED DESCRIPTION OF THE PREFERRED EMBODIMENTS

The present invention is a system for indicating battery charge comprising a safety cover with an opening, a battery that can be placed in the cover in two orientations, and two markings on the battery, one of which indicates the battery is charged and the other which indicates the battery is discharged. Only one of the markings shows through the opening when the cover is placed on the battery. Therefore, when the user has discharged the battery, he may place the safety cover in the orientation indicating discharge. Similarly, when the user has charged a battery, he places the safety cover on the battery in the orientation indicating a full charge. This provides an easy means for the user to remember the state of charge of batteries not connected to an electronic device.

Figure 1:
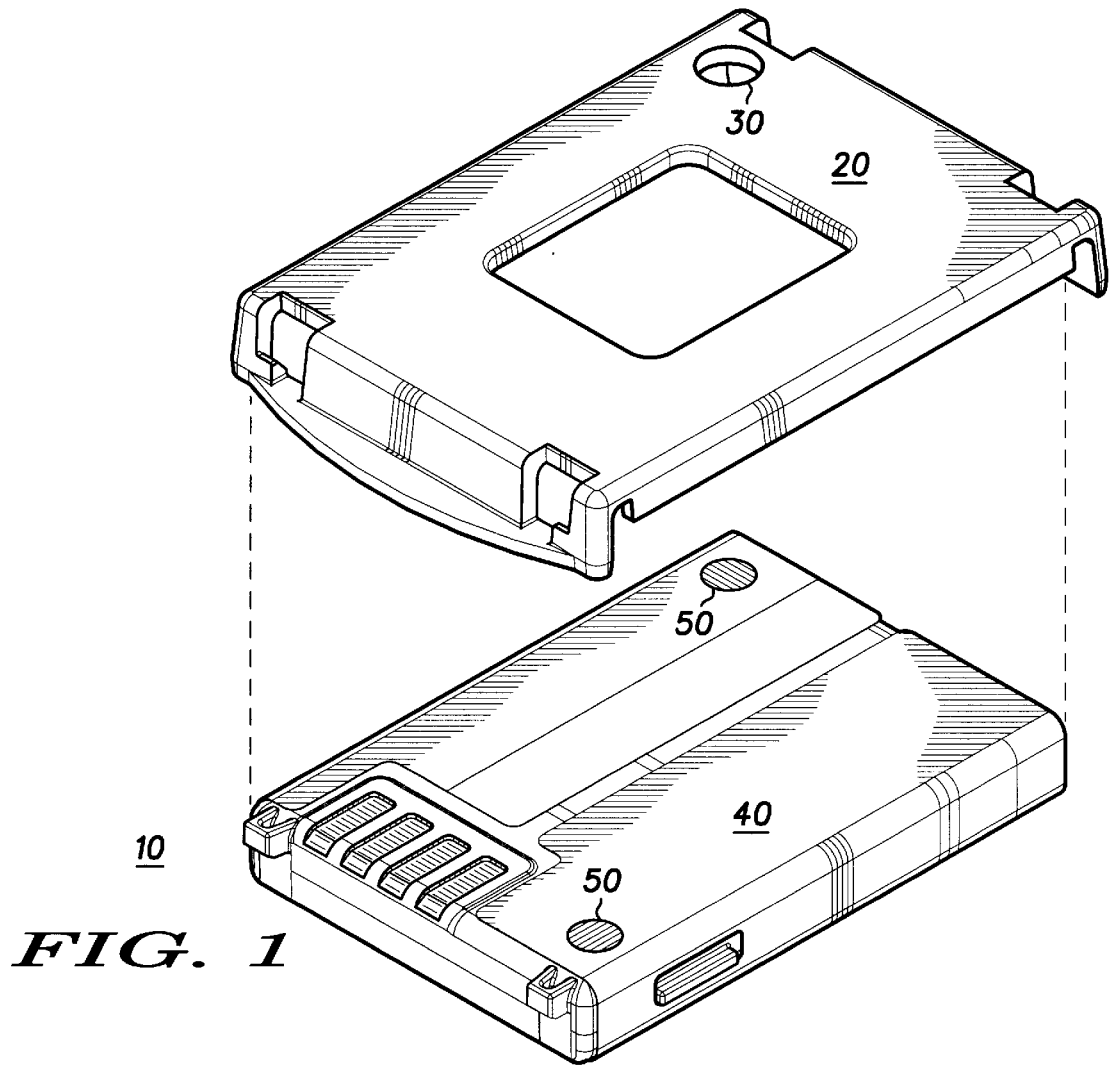
FIG. 1 is a perspective view of the battery charge indicating system of the present invention.
Figure 2:
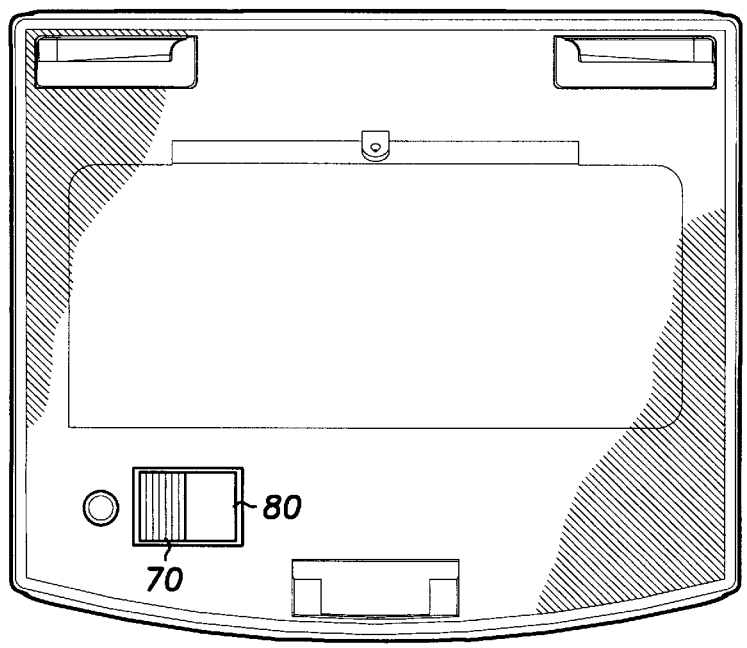
FIG. 2 is a plan view of a prior art battery safety cover.

FIG. 1 shows the system (10) of the present invention. Battery safety cover (20) has opening (30). Safety cover (20) may be placed on battery (40) in two different orientations. When safety cover (20) is placed on battery (40) in one orientation, one of the markings (50) on the battery shows through the opening (30). When safety cover (20) is placed on the battery (40) in the second orientation, the other marking (50) on the battery shows through opening (30). Markings (50) on the battery are different in that they may be different color codes, or words such as "charged," "discharged," or the like. This system (10) provides an easy and effective mnemonic device for the user to remember the state of charge of batteries in his possession. The system (10) is easy to manufacture, and replaces a more complicated system involving the sliding piece in an aperture in the safety cover of a battery. A plan view of a prior art safety cover (60) is shown in FIG. 2. Slider switch (70) slides back and forth in aperture (80), showing different charge-state indications on the battery. This prior art mnemonic system is much more costly and complicated to manufacture than the system of the present invention. This system may be used with any battery for which the user desires to quickly and easily remember the state of charge. For example, the system may be used with batteries for cellular telephones, two-way radios, portable computers, portable televisions, etc.

In one embodiment of the invention, the safety cover has a "snap" function and latch onto the battery. In one embodiment of the invention, the safety cover is made of materials such as plastic or rubber.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A system for indicating the state of charge of a battery comprising:
   (a) a safety cover with an opening;
   (b) a battery that can be placed in the safety cover in two orientations;
   (c) two markings on the battery, one of which indicates the battery is charged, the other which indicates the battery is discharged, where only one of the markings shows through the opening when the safety cover is placed on the battery in one orientation, and only the other marking shows through the opening when the safety cover is placed on the battery in the second orientation.

2. An system of claim 1, where the battery is a battery for an electronic device selected from the group consisting of cellular telephones, radios, and computers.

3. The system of claim 1, where the safety cover has a snap-lock feature for latching onto the battery.

* * * * *